United States Patent Office 3,718,644
Patented Feb. 27, 1973

3,718,644
ANTIBIOTIC SEPARATION AND PURIFICATION
Roy G. Weston, Matawan, and Irving Putter, Martinsville, N.J., assignors to Merck & Co., Inc., Rahway, N.J.
No Drawing. Filed June 30, 1970, Ser. No. 51,320
Int. Cl. C07d 99/24
U.S. Cl. 260—243 C
16 Claims

ABSTRACT OF THE DISCLOSURE

A method for the recovery and purification of an antibiotic mixture comprising 7β-(D-5-amino-5-carboxyvaleramido) - 3 - (α-methoxy-p-sulfooxycinnamoyloxymethyl)-7-methoxy-3-cephem-4-carboxylic acid and the p-hydroxy analog thereof and the separation of those components from each other.

This invention relates to a novel method for the recovery and purification from fermentation broth of a novel antibiotic mixture which contains the two products: 7β-(D-5-amino - 5 - carboxyvaleramido)-3-(α-methoxy-p-sulfooxycinnamoyloxymethyl) - 7 - methoxy-3-cephem-4-carboxylic acid (Ia) and 7β-(D-5-amino-5-carboxyvaleramido) - 3 - (α-methoxy-p-hydroxycinnamoyloxymethyl)-7-methoxy-2-cephem-4-carboxylic acid (Ib). These products have the following planar formula:

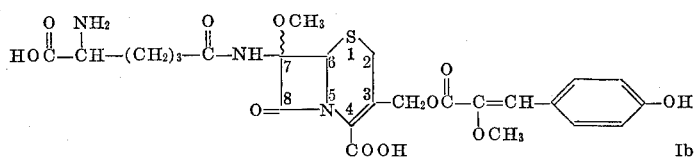

wherein R is a hydroxy or sulfooxy, i.e., —OSO₃H. Hereinafter this antibiotic mixture is identified as mixture I.

Both the mixture I and the products Ia and Ib isolated therefrom are broad spectrum agents which exihibit an approximately balanced gram-negative and gram-positive effect. This includes activity in vivo against the following gram-negative organisms: *Proteus vulgaris*, *Proteus mirabilis*, *Salmonella schottmuelleri*, *Salmonella gallinarum*, *Salmonella pullorum*, *Escherichia coli* and *Klebsiella pneumoniae* and in vivo activity aagainst the following gram-positive organisms: *Staphylococcus aureus*, *Streptococcus pyogenes* and *Dipolcoccus pneumoniae*.

A further object of this invention is the separation of the said individual products from the mixture I and from each other.

Of the two products comprising the antibiotic mixture (I) 7β-(D-5-amino-5-carboxyvaleramido)-3-(α-methoxy-p-sulfooxycinnamoyloxymethyl) - 7 - methoxy-3-cephem-4-carboxylic acid is the most effective in inhibiting the growth of various microorganisms. This product has the following formula:

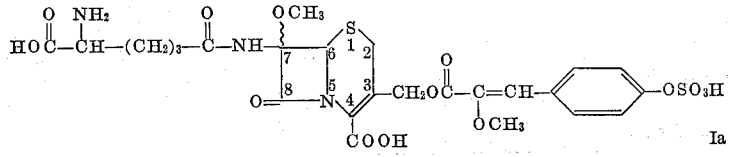

and hereinafter in this specification this product is identified as product Ia. Product Ia has a greater resistance to cephalosporinases than cephalosporin C and cephalothin and is characterized by a low order of toxicity in mice. In addition it is more resistant to enzymatic degradation than cephalosporin C and it is bactericidal. Given orally it protects against infections due to *Proteus vulgaris* and, when administered subcutaneously, it is effective against a variety of gram-negative and gram-positive infections.

The product 7β-(D-5-amino-5-carboxyvaleramido)-3-(α - methoxy-p-hydroxycinnamoyloxymethyl)-7-methoxy-3-cephem-4-carboxylic acid is the second principal component of the antibiotic mixture I. This product has the following structural formula:

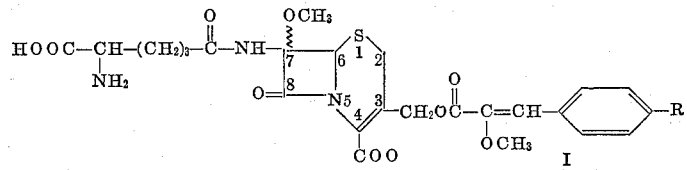

and hereinafter in this specification this compound is identified as product Ib.

Purification of antibiotic mixture I

According to this invention the antibiotic mixture I is purified by absorbing fermentation broth or an impure solution containing the said mixture on an ion exchange resin as, for example, on a synthetic anion exchange resin derived from dextrose or from an acrylic copolymer or from a non-ionic cross-linked polymer or by contact with a suitable cation exchange resin. The adsorbed antibiotic is eluted from the resin or polymer adsorbate with any suitable solvent as, for example, with an aqueous solution or with an aqueous alcoholic solution of a suitable salt or with an aqueous solution of an inorganic acid. If desired, the eluate obtained according to this procedure can then be further purified by a second and third adsorption and elution step. Concentrates of all the eluates are then obtained and the active fractions are combined to afford the purified mixture I.

In practice, the elution step is most advantageously conducted with water or an aqueous alcoholc solution or with an aqueous alcoholic solution of one or more suitable salts such as ammonium chloride, sodium chloride or potassium chloride and the like or by elution with an aqueous solution of a lower alkyl ketone or by elution with an aqueous solution of a mineral acid such as hydrochloric acid, sulfuric acid or phosphoric acid and the like. If desired, the eluates obtained according to this procedure can be further purified by a second and third adsorption and elution step. Concentrates of all the eluates are then obtained to afford the purified antibiotic mixture I. Typical eluants which may be employed are, for example, (1) 5%, 60% and 90% solutions of methanol and water, (2) a dilute solution of hydrochloric acid as, for example, pH 0.95 hydrochloric acid, (3) a 20% or 25% solution of acetone and water, (4) a mixture of pH 7.5 solution of 1 M sodium nitrate and 0.1 M sodium acetate, (5) a solution of 0.5 M ammonium bromide and 0.5 M acetic acid and (6) a 1% solution of formic acid in water.

Illustrative of the ion exchange resins and polymers which may be employed in this process are, for example, DEAE Sephadex A–25,[1] which is a synthetic anion exchange resin derived from the polysaccharide dextran, in its chloride form or Amberlite IRA–68 [2] which is a synthetic anion exchange resin consisting of a cross-linked acrylic copolymer containing a weakly basic tertiary amine, or Amberlite XAD–2 [2] which is a non-ionic cross-linked polystyrene polymer sorbent. Suitable cation ion exchange resins which may be employed include, for example, resins of the sulfonate type having a styrene-divinylbenzene matrix, for example, the polystyrene nuclear sulfonic acid resin Dowex 50×2 [3] on the hydrogen cycle.

The pH of the fermentation broth comprising the antibiotic mixture I is not critical and, in general, the crude broth may be used directly in the recovery and purification procedure. However, it is usually advantageous to adjust the acidity of the broth to a pH in the range of from about 2 to 7 and in practice it is especially advantageous to provide a pH of from about 3 to 4.

Bioassay

The bioassay procedure employed in respect of both the antibiotic mixture I and the individual product Ia and Ib is conducted by a disc-plate procedure using *Proteus vulgaris* (MB–838) as the test organism. The test organism is maintained as a slant culture on nutrient agar (Difco) plus 0.2% yeast extract (Difco). The inoculated slants are incubated at 37° C. for 18–24 hours and stored at refrigerator temperatures for one week, fresh slants being prepared each week.

The inoculum for the assay plates is prepared each day by inoculating at 250 ml. Erlenmeyer flask containing 50 ml. of nutrient broth (Difco) plus 0.2% yeast extract (Difco) with a scraping from the slant. The flask is incubated at 27° C. on a shaking machine for 18–24 hours. The broth culture is then adjusted to 40% transmittance at a wavelength of 660 m$\mu$, using a Bausch & Lomb Spectronic 20 by the addition of 0.2% yeast extract solution to the growth. Uninoculated broth is used as a blank for this determination. The adjusted broth (30 ml.) is used to inoculate 1 liter of medium.

Nutrient agar (Difco) plus 0.2% yeast extract (Difco) is used as the assay medium. This medium is prepared, sterilized by autoclaving and allowed to cool to 50° C. After the medium is inoculated, 10 ml. is added to each of several sterile petri dishes and the medium is allowed to solidify. Assays were run on these plates by the disc-plate procedure using 0.5 inch filter paper discs. The assay plates were incubated for 20–24 hours at 37° C. In the following examples assays are expressed as mm. diameter zone of inhibition. They were used to determine relative potencies or, when compared with a purified reference standard, the potency in $\mu$g./ml. When such an assay is performed in a quantitative fashion from 2 to 4 $\mu$g./ml. of antibiotic can be detected.

The bioactivity of the eluates obtained according to this purification procedure are measured by assaying the eluates against *Proteus vulgaris* MB–838 (ATCC 21100 and NRRL B–3361) and *Vibro percolans* MB–1272 (ATCC 8461).

Separation and purification of components

The purified mixture (I) obtained via the foregoing method can be separated into its components 7$\beta$-(D-5-amino - 5 - carboxyvaleramido)-3-($\alpha$-methoxy-p-sulfooxycinnamoyloxymethyl) - 7-methoxy-3-cephem-4-carboxylic acid (Ia) and 7$\beta$-(D-5-amino-5-carboxyvaleramido)-3-($\alpha$ - methoxy-p-hydroxycinnamoyloxymethyl)-7-methoxy-3-cephem-4-carboxylic acid (Ib), by chromatographic means. This process includes:

(1) Chromatography on a strongly hydrophylic anion exchange resin derived from polysaccharides developed with an ammonium bromide-formic acid system. Various concentrations of this system may be employed but, in practice, a solution of 0.5 M ammonium bromide and 0.1 M formic acid is preferred. Typical of the resins which may be employed are those derived from dextrose in its chloride form, i.e., with chloride counter ions, as illustrated by the DEAE Sephadex A–25 resin described above.

(2) Chromatography on a weakly basic anion exchange resin. This is a group separation where material in crude form is fed at a pH of about 3 to 3.5 and eluted first with an acid at a pH of about 2 and then with a mixture of sodium chloride and hydrochloric acid at a pH of about 1. Suitable resins include the cross-linked acrylic copolymer resins which contain a weakly basic tertiary amine. Amberlite IRA–68 is a typical example and is particularly suitable for this method.

(3) Chromatography on a non-ionic cross-linked polystyrene polymer such as Amberlite XAD–2. Elution is effected with a suitable aqueous system but, in general, it is most advantageous to employ a mixture of water and a lower alkyl ketone such as acetone. Typical of the eluants which may be employed are, for example, 10% methanol in water followed by 50% methanol in water. Alternatively, 20% acetone in water can be substituted for the 50% methanol in water solution.

The individual products Ia and Ib obtained via the above procedure may be purified by rechromatography. Thus, for example, 7$\beta$-(D-5-amino-5-carboxyvaleramido)-3-($\alpha$-methoxy - p - sulfooxycinnamoylmethyl)-7-methoxy-3-cephem-4-carboxylic acid (Ia) may be repurified by subjecting that product to the purification method described in Method 1, supra, followed by desalting on Amberlite XAD–2 absorbent; and 7$\beta$-(D-5-amino-5-carboxyvaleramido)-3-($\alpha$-methoxy - p - hydroxycinnamoyloxymethyl)-7-methoxy-3-cephem-4-carboxylic acid may be repurified by rechromatography on a Sephadex A–25 anion exchange resin developed with a solution of 0.5 M ammonium bromide and 0.05 M acetic acid.

In practice, the antibiotic mixture I is fed to a column containing the adsorbent and a suitable eluate is pumped through the bed. As in the case of the purification of the antibiotic mixture I described above, the elution is conducted so that fractions or "cuts" are obtained and these are bioassayed against a standard assay microorganism such as *Proteus vulgaris* (MB–838) so as to obtain those fractions which contain the highest concentration of antibiotic. In general, the highest concentration of 7$\beta$-(D-5-amino - 5 - carboxyvaleramido)-3-($\alpha$-methoxy-p-hydroxycinnamoyloxymethyl)-7-methoxy - 3 - cephem-4-carbox- ---
[1] Pharmacia Fine Chemicals, Inc., 800 Centennial Ave., Piscataway, New Market, N.J. 08854.
[2] Rohm & Haas Co., Philadelphia, Pa. 19105.
[3] Dow Chemical Co., 2040 Abbott Road Center, Midland, Mich. 48640.

ylic acid (Ib) was found in the initial fractions whereas the later fractions, similarly combined and bioassayed, afforded the product 7β-(D-5-amino - 5 - carboxyvaleramido)-3-(α-methoxy - p - sulfooxycinnamoyloxymethyl)-7-methoxy-3-cephem-4-carboxylic acid (Ia).

Preparation of antibiotic mixture (I)

The antibiotic mixture (I) comprising products Ia and Ib is obtained by growing under controlled conditions a previously unknown strain of microorganism. This procedure consists in the aerobic fermentation of a suitable aqueous nutrient medium via inoculation with a *Streptomyces griseus* culture. This microorganism, which was isolated from a soil sample is a new actinomycete and has been designated as MA–2837 in the culture collection of Merck & Co., Inc., Rahway, N.J. This culture has been placed on permanent deposit with the culture collection of the Northern Utilization Research and Development Branch of the U.S. Department of Agriculture in Peoria, Ill. and has been assigned the culture number NRRL 3851.

Aqueous mediums which may be employed in the fermentation are those conventionally employed for the production of other antibiotics. Such mediums contain sources of carbon and nitrogen assimilable by the microorganism and inorganic salts.

The exact composition and quantity of the carbohydrate source utilized depends in part upon the other ingredients of the medium but, in general, the amount of carbohydrate usually varies between about 1% and 6% by weight. Illustrative of the carbohydrate sources which may be employed in the fermentation are, for example, sugars such as glucose, arabinose, maltose, xylose, mannitol and the like or starches such as grains, for example, oats, rye, cornstarch, corn meal and the like which, if desired, can be used either alone or in combination as sources of assimilable carbon in the nutrient medium. In general any proteinaceous material may be used as a nitrogen source in the fermentation process. Suitable nitrogen sources include, for example, yeast hydrolysates, yeast autolysate, soybean meal, hydrolysates of casein, corn steep liquor, distillers' solubles or tomato paste and the like. The sources of nitrogen, either alone or in combination, are used in amounts ranging from about 0.2 to 6% by weight of the aqueous medium.

The fermentation is carried out at temperatures in the range from about 20° C. to 37° C.; however, for optimum results it is preferable to conduct the fermentation at temperatures of from about 22° C. to 30° C. The pH of the nutrient mediums suitable for growing the *Streptomyces griseus* culture (MA–2837) and producing the antibiotic mixture I should be in the range of from about 5.5 to 8.0.

The antibiotic mixture I and products Ia and Ib effectively inhibit the growth of various species of Salmonella and therefore can be used as disinfectants. Thus, for example, 7β-(D-5-amino - 5 - carboxyvaleramido)-3-(α-methoxy - p - hydroxycinnamoyloxymethyl) - 7 - methoxy-3-cephem-4-carboxylic acid (Ib) and 7β-(D-5-amino-5-carboxyvaleramido)-3-(α - methoxy - p - sulfooxycinnamoyloxymethyl)-7-methoxy-3-cephem-4-carboxylic acid (Ia) exhibit activity against *Salmonella schottmuelleri* and *Salmonella gallinarum* and this property is indicative of their usefulness as sanitizing agents in household and industrial applications.

Products Ia and Ib comprising the antibiotic mixture I are described as having the 5-amino-5-carboxyvaleramido moiety in the beta configuration with respect to the cephem nucleus. This designation is based upon information currently available but applicants do not wish to be bound by this designation of spatial configuration in the event later information proves this to be incorrect.

The examples which follow illustrate the process of this invention. However, the claimed process is capable of wide variation and modification and therefore any minor departure therefrom or extension thereof is considered as being within the scope of the artisan and as falling within the scope of this invention.

EXAMPLE 1

Purification of Antibiotic Mixture and Separation Into Components

Step A: Fermentation

Stage 1: The contents of lyophilized tube of *Streptomyces griseus* (MA–2837) was suspended in two ml. of Medium I (described in Example 1) and the resulting inoculum was used to inoculate slants of the same medium. These slants were incubated at 28° C. for five days or until well-sporulated and then ten ml. of Medium VIII, infra, was added to the slants.

| Medium VIII: | Percent |
|---|---|
| Meat extract | 0.3 |
| NaCl | 0.5 |
| NZ[1] amine | 1 |
| Dextrose | 1 |
| pH 7.0. | |

[1] An enzymatic digested casein.

The growth of each slant was scraped into suspension and the suspension was used as the inoculum in Stage 2, infra.

Stage 2: The suspension obtained in Stage 1 was used to inoculate a 250 ml. baffled Erlenmeyer flask containing 50 ml. of sterilized Medium VIII (described in Stage 1). The inoculated flask was then placed on a 220 r.p.m. rotary shaker and incubated for 48 hours at 28° C.

Stage 3: The contents of an inoculum flask from Stage 2 was used to inoculate a two-liter baffled Erlenmeyer flask containing 500 ml. of the medium identified as Medium VIII in Stage 1. The inoculated flask was then placed on a 220 r.p.m. rotary shaker and incubated for 48 hours at 28° C.

Stage 4: An inoculum of 500 ml. of the resulting growth from Stage 3 was used to inoculate a 200 gallon stainless steel fermentor containing 467 liters of a sterile Medium VIII (described in Stage 1). The fermentation was allowed to proceed at a temperature of 28° C. with agitation (130 r.p.m.) while maintaining an air flow of 10 c.f.m. for 65 hours. During the fermentation an antifoam agent, Polyglycol 2000, was added in small quantities to prevent excessive foaming.

Stage 5: An inoculum of 100 gallons of the resulting growth from Stage 4 was used to inoculate a 1500 gallon stainless steel fermentor containing 1200 gallons of medium IX, infra.

| Medium IX: | Percent |
|---|---|
| Corn steep liquor | 4 |
| Dextrose | 2 |
| pH adjusted to 7.2 with NaOH. | |

The fermentation was allowed to proceed at a temperature of 28° C. with agitation (120 r.p.m.). While maintaining air flow of 55.3 c.f.m. for 30–36 hours. During the fermetation Polyglycol 2000 was added in small quantities to prevent excess foaming. The batch was harvested and activity was determined by disc-plate assay. Using 0.5 inch discs this broth gave an inhibition zone of 32.5 mm. against *Proteus vulgaris* MB–838 when harvested at 31 hours age.

Step B: Isolation of antibiotic mixture

Filtered broth (1075 gal.) from Step A, Stage 5, was harvested after 36 hours and the pH adjusted from the range of 7–8 to 3.0 in the fermentor by the addition of phosphoric acid. The mycelia were removed by passage through a plate-screen type filter press and discarded. The filtered broth was then passed through a 100 gal. bed of Amberlite XAD-2 adsorbent resin at a flow rate of 10 gallons per minute. The spent broth was assayed and discarded and the resin bed was washed with two volumes of water. The antibiotic was eluted the resin bed with a 60% solution of methanol and water at a flow rate of 5 gallons per minute. Forty fractions, each 5 gallons, were collected and assayed. Fractions 2 through 40 were combined and the methanol was removed by vacuum evaporation. The final concentrate (41.5 gal.) was adjusted to pH 3.5 by the addition of ammonium hydroxide and held frozen.

Samples of the antibiotic mixture thus obtained were bio-assayed by the disc-plate method against *Proteus vulgaris*.

Filtered broth: Assays run on 1060 gallons of filtered broth gave the following zone diameter.

Filtered broth

| Dilution: | Zone size, mm. |
|---|---|
| 1:2 | 26.8 |
| 1:4 | 23.8 |
| 1:8 | 21.1 |

Spent broth and wash: Ten fractions of 100 gallons each assayed zero without dilution. The water wash assayed zero.

Eluate fractions: Assays were run on all fractions. The zone diameters are tabulated below:

Eluate fractions

| Fraction | Zone size, mm. |
|---|---|
| 1 | 0 |
| 2 | 28 |
| 3 | 35 |
| 4 | 34 |
| 5 | 36 |
| 6 | 36 |
| 7 | 36 |
| 8 | 38 |
| 9 | 38 |
| 10 | 36 |
| 11 | 36 |
| 12 | 38 |
| 13 | 40 |
| 14 | 37 |
| 15 | 36 |
| 16 | 37 |
| 17 | 38 |
| 18 | 36 |
| 19 | 36 |
| 20 | 35 |
| 21 | 33 |
| 22 | 33 |
| 23 | 34 |
| 24 | 34 |
| 25 | 33 |
| 26 | 34 |
| 27 | 32 |
| 28 | 33 |
| 29 | 32 |
| 30 | 32 |
| 31 | 32 |
| 32 | 30 |
| 33 | 30 |
| 34 | 30 |
| 35 | 28 |
| 36 | 27 |
| 37 | 28 |
| 38 | 26 |
| 39 | 26 |
| 40 | 26 |

Eluate composite and eluate concentrate: Assays were also run on 195 gallons of eluate composite and 41.5 gallons of eluate concentrate.

Eluate composite

| Dilution: | Zone size, mm. |
|---|---|
| 1:5 | 28.8 |
| 1:10 | 27.0 |
| 1:20 | 23.8 |
| 1:40 | 21.0 |
| 1:16 | 27.25 |
| 1:32 | 24.5 |

| Total solids assay: | Kg. |
|---|---|
| Filtered broth | 119 |
| 195 gallon eluate composite | 7.23 |
| 41.5 gallon eluate concentrate | 7.20 |

Step C: Purification on an anion exchange resin

The concentrate from Step B (20.7 gal.) was diluted to 31 gallons with water and adsorbed on a 22.5 liter bed of weakly basic anion exchange resin (Amberlite IRA-68 resin on the chloride cycle) at pH 4.0 and a flow of 2 gallons per minute. This was followed by a 45 liter water wash whereafter the resin bed was eluted with a pH 7.5 solution of 1 M sodium nitrate and 0.1 M sodium acetate at a flow rate of 1.5 liters per minute. Ten five gallon eluate fractions were then collected and the pH adjusted to 4 with hydrochloric acid as collected.

All fractions were bio-assayed by the disc-plate method against *Proteus vulgaris* as follows:

| Feed solution | | Eluate fractions; dilution 1:10 | | | |
|---|---|---|---|---|---|
| Dilution | Zone size, mm. | Fraction | Zone size, mm. | Fraction | Zone size, mm. |
| 1:10 | 28.5 | 1 | 27 | 6 | 25 |
| 1:20 | 26.5 | 2 | 30 | 7 | 23 |
| 1:40 | 24 | 3 | 28.5 | 8 | 22 |
| | | 4 | 26 | 9 | 21 |
| | | 5 | 26 | 10 | 17.5 |

The spent stream assayed 25 mm. without dilution and the water wash assayed 23 mm. without dilution.

Step D: Additional purification of the antibiotic mixture

Fractions 1 through 10 from Step C were combined and fed to a 45 liter bed of Amberlite XAD-2 adsorbent at pH 3.0 and at a flow rate of 5 liters per minute. The resin bed was washed with 90 liters of water at the same rate. The antibiotic was then eluted from the resin by a 25% solution of acetone and water at a flow rate of 5 liters per minute. Sixteen five gallon fractions were collected.

All fractions were assayed by disc-plate method against *Proteus vulgaris* as follows: The feed (190 liters) gave the following zone diameters:

Feed solution

| Dilution: | Zone size, mm. |
|---|---|
| 1:5 | 30 |
| 1:10 | 27.5 |
| 1:20 | 24.2 |

The zone diameters of the eluate fractions are tabulated below:

Eluate fraction

| Fraction | Dilution | Zone size, mm. | Fraction | Dilution | Zone size, mm. |
|---|---|---|---|---|---|
| 1 | 1:10 | 20.5 | 9 | 1:10 | 25 |
| 2 | 1:10 | 29 | 10 | 1:10 | 26.5 |
| 3 | 1:10 | 29 | 11 | 1:5 | 26 |
| 4 | 1:10 | 29 | 12 | 1:5 | 28 |
| 5 | 1:10 | 28 | 13 | 1:5 | 27.5 |
| 6 | 1:10 | 27 | 14 | 1:5 | 25 |
| 7 | 1:10 | 26 | 15 | 1:5 | 25 |
| 8 | 1:10 | 26 | 16 | 1:5 | 24.5 |

The eluate fractions 2 through 16, supra, were combined and the acetone removed by vacuum evaporation to a final volume of 17.4 liters. The 17.4 liter concentrate was adjusted to pH 4.0 by ammonium hydroxide and freeze dried to yield 620 g. of a purified mixture of 7β-(D-5-amino - 5 - carboxyvaleramido) - 3 - (α-methoxy-p-sulfooxycinnamoyloxymethyl) - 7 - methoxy-3-cephem-4-carboxylic acid and 7β-(D5-amino-5-carboxyvaleramido)-3-(α - methoxy - p-hydroxycinnamoyloxymethyl)-7-methoxy-3-cephem-4-carboxylic acid. This dry product had a bioassay potency of 320 mcg./ml. for a 25 mm. zone.

Step E: Separation of 7β-(D-5-amino-5-carboxyvaleramido)-3-(α-methoxy-p-hydroxycinnamoyloxymethyl)-7-methoxy-3-cephem-4-carboxylic acid A one inch diameter chromatography column was packed to a bed height of 100 centimeters with DEAE Sephadex A–25 anion exchange resin in a system containing 0.5 M ammonium bromide and 0.05 M acetic acid. The mixture of 7β-(D-5-amino-5-carboxyvaleramido)-3-(α - methoxy - p - hydroxycinnamoyloxymethyl) - 7-methoxy-3-cephem-4-carboxylic acid and 7β-(D-5-amino-5 - carboxyvaleramido) - 3 - (α - methoxy - p - sulfooxycinnamoyloxymethyl) - 7 - methoxy - 3 - cephem - 4-carboxylic acid (10.0 g.) obtained in Step D was dissolved in 18 ml. of a solution of 0.5 M ammonium bromide and 0.05 M acetic acid and charged to the column. Eluting solution was pumped through the bed at a rate of 80 ml./hour and 10 ml. fractions of eluate were collected by machine. The eluate stream was monitored by a differential refractometer. The refractometer record showed mass peaks at tubes 19, 36, 79, 109 and 206. Disc plate assays against *Proteus vulgaris* (MB–838) were run on every third fraction using 0.5 inch diameter discs buffered at pH 7.0. The zone diameters are tabulated below (fractions 1 through 66 assayed zero).

| Fraction: | Zone diameter, mm. |
|---|---|
| 69 | 18 |
| 72 | 24 |
| 75 | 26 |
| 78 | 31 |
| 81 | — |
| 83 | 35 |
| 86 | 37 |
| 89 | 38 |
| 92 | 38 |
| 95 | 40+ |
| 98 | 40+ |
| 101 | 40+ |
| 104 | 40+ |
| 107 | 40+ |
| 110 | 40+ |
| 113 | 40 |
| 116 | 38 |
| 119 | 33 |
| 122 | 29 |
| 125 | 28 |
| 128 | 27 |
| 131 | 26 |
| 134 | 24 |
| 137 | 21 |
| 140 | 20 |
| 150 | 18 |
| 160 | 20 |
| 170 | 29 |
| 180 | 35 |
| 183 | 38 |
| 186 | 40 |
| 189 | 40+ |
| 192 | 40+ |
| 195 | 40+ |
| 198 | 40+ |
| 201 | 40+ |
| 204 | 40+ |
| 207 | 40+ |
| 210 | 40+ |
| 213 | 40+ |
| 216 | 40+ |
| 219 | 40 |
| 222 | 38 |
| 225 | 35 |
| 228 | 32 |
| 231 | 31 |
| 234 | 27 |
| 237 | 24 |
| 240 | 23 |
| 243 | 19 |
| 246 | 17 |
| 249 | 0 |
| 252 | 0 |

Fractions 80 through 133 were combined and fractions 170 through 230 were combined.

A repeat of the above run was made and fractions 82–130 were combined and fractions 180–234 were combined.

The fractions containing the first active component from the two above runs were combined and adsorbed on a 100 ml. bed of Amberlite XAD–2 resin. The bed was washed with one volume of water and then eluted with three volumes of a 90% solution of methanol and water. The methanol was removed by vacuum evaporation and the aqueous concentrate was freeze dried to afford 810 mg. of a product identified as 7β-(D-5-amino-5-carboxyvaleramido)-3-(α - methoxy - p - hydroxycinnamoyloxymethyl)-7-methoxy-3-cephem - 4 - carboxylic acid. The bio-potency of this product determined by disc plate assay against *Proteus vulgaris* was 18 μg./ml. affording a 25 mm. zone. Analysis by ultraviolet absorption gave the following characterizing data:

U.V. absorption in 0.1 N HCl $\lambda_{max}$. 305

$E_{1cm}^{\%}$ 524

U.V. absorption in 0.1 N NaOH $\lambda_{max}$. 328

$E_{1cm}^{\%}$ 564

Step F: Separation of 7β-(D-5-amino-5-carboxyvaleramido)-3-(α - methoxy - p - sulfooxycinnamoyloxymethyl)-7-methoxy-3-cephem-4-carboxylic acid The fractions from the two runs on Sephadex A–25 containing the second active component were combined and adsorbed on a 100 ml. bed of Amberlite XAD–2 resin. The bed was washed with one volume of water and then eluted with three volumes of a 90% solution of methanol and water. The rich eluates were combined and methanol was removed by vacuum evaporation. The aqueous concentrate was freeze dried and yielded 720 mg. of 7β-(D-5-amino - 5 - carboxyvaleramido)-3-(α-methoxy-p-sulfooxycinnamoyloxymethyl) - 7 - methoxy-3-cephem-4-carboxylic acid (Ia). Analysis by ultraviolet absorption gave the following characterizing data:

U.V. absorption in 0.1 N HCl $\lambda_{max}$. 287 mm.

$E_{1cm}^{\%}$ 432

U.V. absorption in 0.1 N NaOH $\lambda_{max}$. 280 mm.

$E_{1cm}^{\%}$ 432

EXAMPLE 2

Separation of 7β-(D-amino-5-carboxyvaleramido)-3-(α-methoxy-p-sulfooxycinnamoyloxymethyl) - 7 - methoxy-3-cephem-4-carboxylic acid from antibiotic mixture The mixture of 7β-(D-5-amino-5-carboxyvaleramido)-3 - (α - methoxy - p - sulfooxycinnamoyloxymethyl)-7-methoxy-3-cephem-4-carboxylic acid (Ia) and 7β-(D-5-amino-5-carboxyvaleramido) - 3 - (α-methoxy-p-hydroxycinnamoyloxymethyl)-7-methoxy - 3 - cephem - 4 - carboxylic acid (Ib) (20.0 g.) from Example 5, Step D, was dissolved in water (200 ml.) and the pH of the solution adjusted to 3.5. This solution was passed thru a 200 ml.

bed of Amberlite IRA–68 anion exchange resin on the chloride cycle followed by the addition of 300 ml. of water wash. The bed was then eluted with 1 liter of 1% (v./v.) formic acid in water. This was followed by the addition of two portions of dilute hydrochloric acid pH 0.95. The fed solution, spent and wash, and eluates 1, 2 and 3 were analyzed by paper electrophoresis at pH 4.0 run one hour at 1000 volts D.C. The papergram was dried, exposed to ammonia vapor to neutralize acid and incubated on a nutrient agar plate seeded with *Proteus vulgaris* (MB–838). Examination after 17 hours incubation at 37° C. showed two zones of inhibition in the feed material (in the direction of the anode), only a single component (slower of the two) in the spent and formic acid eluates and a single component in the second hydrochloric acid eluate corresponding with the faster component in the feed. The following table indicates total-solid and bio-assay data:

|  | Mass, g. | Volume, ml. | Total biological units | Product(s) |
|---|---|---|---|---|
| Feed | 20 | 200 | 60,000 | Ia and Ib. |
| Spent and wash | 11.15 | 500 | 7,500 | Ib. |
| Formic acid eluate | 4.52 | 1,000 | 20,000 | Ib. |
| 1st hydrochloric acid eluate |  | 500 | 1,000 |  |
| 2nd hydrochloric acid eluate | 2.10 | 500 | 10,000 | Ia. |

These fractions were recovered by adsorption on Amberlite XAD–2 resin to separate out 7β-(D-5-amino-5-carboxyvaleramido)-3-(α-methoxy - p - sulfooxycinnamoyloxymethyl)-7-methoxy - 3 - cephem-4-carboxylic acid (Ia) and this was eluted by a 50% solution of methanol and water to afford substantially pure product (Ia)

EXAMPLE 3

Separation of 7β-(D-5-amino-5-carboxyvaleramido)-3-(α-methoxy-p-sulfooxycinnamoyloxymethyl)-7-methoxy-3-cephem-4-carboxylic acid from antibiotic mixture A mixture of 7β-(D-5-amino-5-carboxyvaleramido)-3-(α-methoxy-p-sulfooxycinnamoyloxymethyl) - 7 - methoxy-3-cephem-4-carboxylic acid (Ia) and 7β-(D-5-amino-5-carboxyvaleramido)-(α-methoxy - p - hydroxycinnamoyloxymethyl) - 7 - methoxy - 3 - cephem - 4 - carboxylic acid (Ib) (5.0 g.) obtained according to Example 1, Step D, was dissolved in a 20% solution of acetone and water (20 ml.) and the pH adjusted to 4.0. This solution was fed to a 2 inch diameter x 100 cm. height bed of Amberlite XAD–2 adsorbent in 20% acetone and water solution. A solution of 20% acetone and water was pumped through the bed at a rate of 880 ml./hour and 20 ml. fractions were collected automatically.

Disc plate assays against *Proteus vulgaris* (MB–838) were run on every third fraction using 0.25 inch discs. The zone diameters are tabulated below:

| Fraction: | Zone diameter, mm. |
|---|---|
| 1–41 | 0 |
| 44 | 12 |
| 47 | 22 |
| 50 | 25 |
| 53 | 29 |
| 56 | 31 |
| 59 | 35 |
| 62 | 30 |
| 65 | 28 |
| 68 | 27 |
| 71 | 25 |
| 74 | 24 |
| 77 | 21 |
| 80 | 20 |
| 83 | 19 |
| 86 | 16 |
| 89 | 14 |
| 92 | 13 |
| 95 | 13 |
| 98 | 13 |
| 101 | 13 |
| 104 | 14 |
| 107 | 13 |
| 110 | 13 |
| 113 | 11 |
| 116 | 10 |
| 119 | 9 |
| 122 | 8 |
| 125 | 8 |
| 128 | 8 |
| 131 | 0 |
| 134 | 0 |
| 137 | 0 |
| 140 | 8 |
| 143 | 11 |
| 146 | 13 |
| 149 | 13 |
| 152 | 15 |
| 155 | 15 |
| 158 | 16 |
| 161 | 17 |
| 164 | 18 |
| 167 | 17 |
| 170 | 18 |
| 173 | 20 |
| 176 | 21 |
| 179 | 21 |
| 182 | 21 |
| 185 | 21 |
| 188 | 22 |
| 191 | 23 |
| 194 | 23 |
| 197 | 23 |
| 200 | 22 |
| 203 | 24 |
| 206 | 24 |
| 209 | 24 |
| 212 | 24 |
| 215 | 24 |
| 218 | 19 |
| 221 | 18 |
| 224 | 18 |
| 227 | 18 |
| 230 | 17 |
| 233 | 17 |
| 236 | 15 |
| 239 | 15 |
| 242 | 15 |
| 245 | 15 |
| 248 | 14 |
| 251 | 14 |
| 254 | 14 |
| 257 | 13 |
| 260 | 13 |
| 263 | 12 |
| 266 | 12 |
| 269 | 12 |
| 272 | 11 |
| 275 | 11 |
| 278 | 10 |
| 281 | 10 |
| 284 | 9 |
| 287 | 8 |
| 290 | 0 |
| 293 | 0 |
| 296 | 0 |
| 299 | 0 |
| 302 | 0 |
| 330 | Zero |

Fractions 44 through 90 were combined, acetone was removed by vacuum evaporation and the aqueous concentrate was freeze dried to yield 3.3 g. of crude 7β-(D-5-amino-5-carboxyvaleramido) - 3 - (α-methoxy-p-sulfooxycinnamoyloxymethyl)-7-methoxy - 3 - cephem-4-carboxylic acid (Ia).

Fractions 150 through 225 were combined and by similar treatment afforded 700 mg. of 7β-(D-5-amino-5-carboxyvaleramido) - 3 - (α-methoxy-p-hydroxycinnamoyloxymethyl)-7-methoxy - 3 - cephem-4-carboxylic acid (Ib).

A repeat of the above run afforded 3.1 g. of crude 7β-(D-5-amino-5-carboxyvaleramido) - 3 - (α - methoxy-p-sulfooxycinnamoyloxymethyl)-7 - methoxy - 3 - cephem-4-carboxylic acid (Ia) and 400 mg. of 7β-(D-5-amino-5-carboxyvaleramido)-3-(α - methoxy - p - hydroxycinnamoyloxymethyl)-7-methoxy-3-cephem - 4 - carboxylic acid (Ib).

The two quantities of 7β-(D-5-amino-5 - carboxyvaleramido) - 4 - (α - methoxy - p - sulfooxycinnamoyloxymethyl)-7-methoxy-3-cephem-4-carboxylic acid (Ia) obtained according to the foregoing method were combined and the 6.4 g. of material was charged to a 2 inch diameter x 100 cm. height bed of Amberlite XAD-2 adsorbent in a 5% solution of methanol and water. A 5% methanol and water solution was pumped through the bed at a flow rate of 880 ml./hour and 20 ml. fractions were collected automatically. Two hundred and eighty-seven fractions were collected and every fourth fraction was assayed by the disc-plate method against *Proteus vulgaris* (MB-838) using 0.25 inch discs. The assay results are tabulated below. Fractions 1 through 50 were not assayed.

| Fraction: | Zone size, mm. |
|---|---|
| 51 | 23 |
| 55 | 26 |
| 59 | 23 |
| 63 | 18 |
| 67 | 12 |
| 71 | 0 |
| 75 | 0 |
| 79 | 0 |
| 83 | 7 |
| 87 | 9 |
| 91 | 13 |
| 95 | 19 |
| 99 | 21 |
| 103 | 22 |
| 107 | 22 |
| 111 | 21 |
| 115 | 20 |
| 119 | 20 |
| 123 | 19 |
| 127 | 18 |
| 131 | 19 |
| 155 | 16 |
| 139 | 17 |
| 143 | 15 |
| 147 | 16 |
| 151 | 15 |
| 155 | 13 |
| 159 | 11 |
| 163 | 9 |
| 167 | 0 |
| 171 | 0 |
| 287 | Zero |

Fractions 95 through 159 were combined, methanol vacuum evaporated, and the aqueous concentrate freeze dried to yield 700 mg. of 7β-(D-amino-5-carboxyvaleramido)-3-(α-methoxy-p-sulfooxycinnamoyloxymethyl)-7-methoxy-3-cephem-4-carboxylic acid (Ia). The ultraviolet spectra of 7β-(D-5-amino-5-carboxyvaleramido) - 3 - (α-methoxy-p-sulfooxycinnamoyloxymethyl)-7-methoxy - 3 - cephem-4-carboxylic acid (Ia) gave the following adsorption data:

U.V. adsorption in 0.1 N HCl $\lambda_{max}$.

285 $E_{1\,cm.}^{\%}$ 160

U.V. adsorption in 0.1 N NaOH $\lambda_{max}$.

277 $E_{1\,cm.}^{\%}$ 166

When assayed with 0.5 inch diameter discs by the disc-plate method against *Proteus vulgaris* the 7β-(D-5-amino-5-carboxyvaleramido)-3-(α - methoxy - p - sulfooxycinnamoyloxymethyl) - 7 - methoxy - 3 - cephem - 4-carboxylic acid (Ia) sample gave a 25 mm. zone at 88 mcg./ml. and 7β-(D-5-amino-5-carboxyvaleramido) - 3-(α-methoxy - p - hydroxycinnamoyloxymethyl) - 7 - methoxy-3-cephem-4-carboxylic acid (Ib) gave a 25 mm. zone at 167 mcg./ml.

EXAMPLE 4

Purified mixture of 7β-(D-5-amino-5-carboxyvaleramido)-3-(α - methoxy-p-sulfooxycinnamoyloxymethyl) - 7-methoxy-3-cephem-4-carboxylic acid and 7β-(D-5-carboxyvaleramido) - 3 - (α - methoxy - p - hydroxycinnamoyloxymethyl) - 7-methoxy-3-cephem-4-carboxylic acid The concentrate of Example 1, Step B, containing 7β-(D-5-amino-5-carboxyvaleramido) - 3 - (α - methoxy-p-sulfooxycinnamoyloxymethyl)-7-methoxy - 3 - cephem-4-carboxylic acid and 7β-(D-5-amino - 5 - carboxyvaleramido) - 3 - (α - methoxy - p - hydroxycinnamoyloxymethyl)-7-methoxy-3-cephem-4-carboxylic acid was adsorbed on 1500 grams of DEAE Sephadex A–25 anion exchange resin by stirring batchwise for 16 hours at 0° to 5° C. The resin was recovered by filtration, washed with three 20 liter portions of cold water and then transferred to a column. The antibiotic mixture was recovered by elution with 3% ammonium chloride in 70% aqueous methanol and 3.8 liter fractions were collected. The active fractions 3 through 7 were combined and concentrated under vacuum to afford a 3.8 liter portion containing 625 grams of solids. This portion (3.8 liters) was charged to a 20 liter column of Dowex 50X2 resin on the hydrogen cycle. The column was developed with water at 50 ml./minute and 2 liter fractions of effluent were collected and assayed. The active fractions 6 through 33 were combined, concentrated to 4 liters by vacuum evaporation and freeze-dried to yield 41 grams of a purified mixture of 7β-(D - 5 - amino - 5 - carboxyvaleramido) - 3 - (α - methoxy - p - sulfooxycinnamoyloxymethyl) - 7 - methoxy - 3 - cephem - 4 - carboxylic acid and 7β-(D - 5 - amino - 5 - carboxyvaleramido) - 3 - (α-methoxy - p - hydroxycinnamoyloxymethyl) - 7 - methoxy-3-cephem-4-carboxylic acid.

Disc plate assays against *Proteus vulgaris* (MB-838) were run on the starting concentrate and on the purified mixture. A 25 mm. zone was obtained on the starting concentrate at 0.30 mg./ml. The purified mixture gave a 25 mm. zone at 0.033 mg./ml.

The compounds (I) of this invention are described as having the 5-amino-5-carboxyvaleramido moiety in the beta configuration with respect to the cephem nucleus. This designation is based upon information currently available but applicants do not wish to be bound by the designation of spatial configuration in the event later information proves this to be incorrect.

What is claimed is:

1. A method for the recovery and purification of an antibiotic mixture comprising 7β - (D - 5 - amino - 5-carboxyvaleramido) - 3 - (α - methoxy - p - sulfooxycinnamoyloxymethyl) - 7 - methoxy - 3 - cephem - 4-carboxylic acid and 7β-(D-5-amino - 5 - carboxyvaleramido)-3-(α-methoxy - p - hydroxycinnamoyloxymethyl-7-methoxy-3-cephem-4-carboxylic acid and the separation of those components from one another, which comprises contacting an impure solution of the said mixture with an anion exchange resin derived either from dextran in its chloride form or from an acrylic copolymer or with a cation exchange resin consisting of nuclear sulfonic acid groups attached to a styrene-divinylbenzene matrix or with a non-ionic polymer, eluting the adsorbate with a solvent, collecting the eluates and combining the active fractions; and the purified mixture thus obtained is either isolated or, if desired, may be separated into its principal components by chromatographic means.

2. The method of claim 1 wherein the anion exchange resin is derived from a cross-linked acrylic copolymer containing a weakly basic tertiary amine.

3. The method of claim 1 wherein the non-ionic polymer is a cross-linked polystyrene polymer sorbent.

4. The method of claim 1 wherein the eluting solvent is water, an aqueous alcoholic solution, an aqueous alcoholic solution of one or more salts or an aqueous solution of a mineral acid.

5. The method of claim 6 wherein the eluting solvent is a solution of 1 M sodium nitrate and 0.1 M sodium acetate.

6. The method of claim 1 wherein the impure antibiotic mixture is fermentation broth having a pH of from about 2 to 7.

7. The method of claim 1 wherein the purified mixture thus obtained is separated into its components 7β-(D-5-amino-5-carboxyvaleramido)-3-(α-methoxy-p - sulfooxycinnamoyloxymethyl)-7-methoxy-3-cephem-4 - carboxylic acid and 7β-(D-5-amino-5-carboxyvaleramido)-3-(α-methoxy-p-hydroxy-cinnamoyloxymethyl)-7-methoxy - 3 - cephem-4-carboxylic acid by contacting the mixture with a strongly hydrophylic anion exchange resin derived from polysaccharides or with a weakly basic anion exchange resin derived from a cross-linked acrylic copolymer under acidic conditions, or by contacting with a non-ionic cross-linked polystyrene polymer sorbent, followed by the elution of the resulting adsorbate with a solvent and the collection of two eluate fractions containing the two highest concentrations of antibiotic.

8. The method according to claim 7 wherein the first eluate fraction containing the first concentration of antibiotic is contacted with a non-ionic cross-linked polysytrene polymer sorbent and eluted with an aqueous alcoholic solution to afford 7β-(D-5-amino-5-carboxyvaleramido)-3-(α-methoxy-p - hydroxycinnamoyloxymethyl)-7-methoxy-3-cephem-4-carboxylic acid.

9. The method according to claim 7 wherein the second eluate fraction containing the second concentration of antibiotic is contacted with a non-ionic cross-linked polystyrene polymer sorbent and eluted with an alcoholic aqueous solution to afford 7β-(D-5-amino-5-carboxyvaleramido)-3-(α-methoxy - p - sulfooxycinnamoyloxymethyl)-7-methoxy-3-cephem-4-carboxylic acid.

10. The method of claim 7 wherein the mixture is contacted with an anion exchange resin derived from dextran in its chloride form.

11. The method of claim 8 wherein the first eluate fraction is contacted with a non-ionic cross-linked polystyrene polymer sorbent.

12. The method of claim 9 wherein the second eluate fraction is contacted with a non-ionic cross-linked polystyrene polymer sorbent.

13. The method of claim 9 wherein the eluant is a solution of methanol and water.

14. The method according to claim 1 for the separation and purification of 7β-(D-5-amino-5-carboxyvaleramido)-3-(α-methoxy-p-sulfooxycinnamoyloxymethyl)-7 - methoxy-3-cephem-4-carboxylic acid from an antibiotic mixture, which comprises contacting a mixture comprising 7β-(D-5-amino-5-carboxyvaleramido)-3-(α-methoxy-p - sulfooxycinnamoyloxymethyl)-7-methoxy-3-cephem-4 - carboxylic and 7β-(D-5-amino-5-carboxyvaleramido)-3 - (α-methoxy-p-hydroxycinnamoyloxymethyl)-7-methoxy - 3-cephem-4-carboxylic acid with a cross-linked acrylic copolymer anion exchange resin, eluting the adsorbate with a solvent, collecting the eluate fractions, contacting the fractions with a non-ionic cross-linked polystyrene polymer sorbent and eluting the adsorbates with an aqueous alcoholic solution.

15. A method for the recovery and purification of an antibiotic mixture comprising 7β-(D-5-amino-5-carboxyvaleramido)-3-(α-methoxy - p - sulfooxycinnamoyloxymethyl)-7-methoxy-3-cephem-4 - carboxylic acid and 7β-(D-5-amino-5-carboxyvaleramido)-3-(α-methoxy-p - hydroxycinnamoyloxymethyl)-7-methoxy-3-cephem-4 - carboxylic acid, which comprises contacting an impure solution of the said mixture with an anion exchange resin derived either from dextran in its chloride form or from an acrylic copolymer or with a cation exchange resin consisting of nuclear sulfonic acid groups attached to a styrene-divinylbenezne matrix or with a non-ionic polymer, eluting the adsorbate with a solvent, collecting the eluates and combining the active fractions.

16. A method for the separation of 7β-(D-5-amino-5-carboxyvaleramido)-3-(α-methoxy-p - sulfooxycinnamoyloxymethyl)-7-methoxy-3-cephem-4-carboxylic acid and 7β-(D-5-amino-5-carboxyvaleramido)-3-(α-methoxy - p-hydroxycinnamoyloxymethyl)-7-methoxy-3 - cephem - 4-carboxylic acid from a mixture containing same, which comprises contacting the mixture with an anion exchange resin derived either from dextran in its chloride form or from an acrylic copolymer or with a cation exchange resin consisting of nuclear sulfonic acid groups attached to a styrene-divinylbenzene matrix or with a non-ionic cross-linked polystyrene polymer sorbent, eluting the adsorbate with a solvent, collecting the eluate fraction containing the two highest concentrations of antibiotic, contacting the fractions with a non-ionic cross-linked polystyrene polymer sorbent and eluting the adsorbates with a solvent to afford the desired products.

References Cited

UNITED STATES PATENTS

| | | | |
|---|---|---|---|
| 3,184,454 | 5/1965 | Abraham et al. | 260—243 C |
| 3,467,654 | 9/1969 | McCormick | 260—243 C |

NICHOLAS S. RIZZO, Primary Examiner

U.S. Cl. X.R.

260—240 J